April 4, 1939. D. L. YABROFF 2,152,720
PROCESS FOR REMOVING ACID COMPONENTS FROM HYDROCARBON DISTILLATES
Filed Sept. 28, 1936
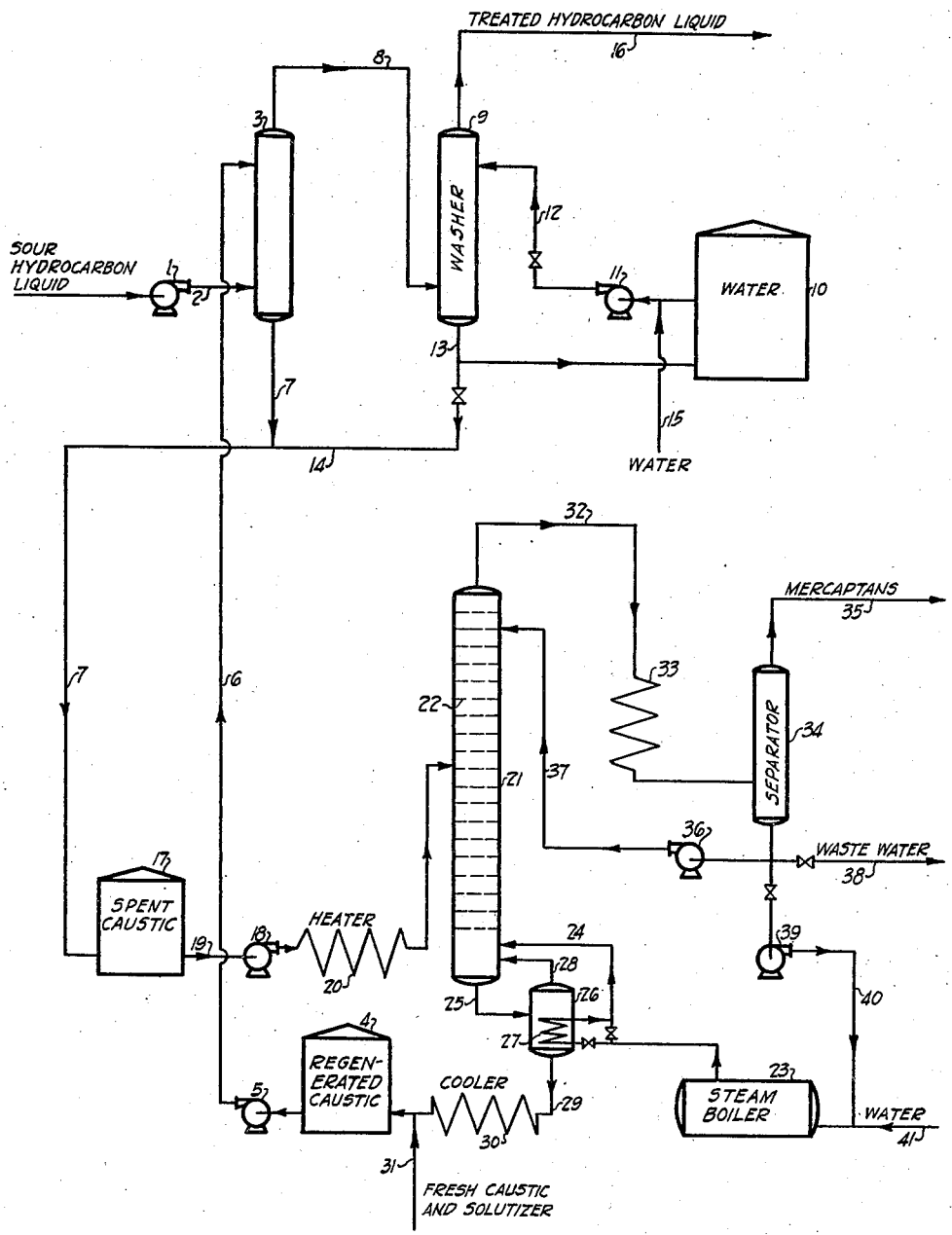
Inventor: David Louis Yabroff
By His Attorney:

UNITED STATES PATENT OFFICE 2,152,720

PROCESS FOR REMOVING ACID COMPONENTS FROM HYDROCARBON DISTILLATES

David Louis Yabroff, Oakland, Calif., assignor to Shell Development Company, San Francisco, Calif., a corporation of Delaware Application September 28, 1936, Serial No. 102,892

9 Claims. (Cl. 196—32)

This invention relates to the removal of weakly acid-reacting organic substances from solutions in hydrophobe organic liquids, and in particular deals with the removal of mercaptans from petroleum distillates.

It is frequently necessary to eliminate small quantities of organic acidic components such as mercaptans, phenols, naphthenic acids, fatty acids, etc. from their solutions in substantially neutral or basic organic liquids. By hydrophobe organic liquids, as herein used, is meant hydrophobe normally liquid organic substances which are neutral or slightly basic, such as the liquid hydrocarbons derived from petroleum, benzene, toluene, xylene, substituted normally liquid hydrocarbons which are substantially insoluble in water, for instance, chlorinated hydrocarbons, of which chlor ethane, ethylene dichloride, trichlorethylene, carbon tetrachloride, chlor propane, chlorbutylene, chlorbenzene, brom benzene, are examples; or nitro hydrocarbons, for example, nitroethane, nitrobenzene; or other nitrogen containing hydrocarbons such as amyl or higher amines, aniline, pyridine, petroleum bases, etc.

In the Yabroff and Givens application, Serial No. 80,374, filed May 18, 1936, it was shown that the efficacy of the removal of acidic organic substances from their solution in hydrocarbon type liquids by means of alkaline-reacting solutions which are substantially immiscible with said liquids, depends largely on the solvent power of the alkaline solution for the organic acids and on its alkalinity. As a means for producing aqueous alkaline solutions of good solvent power for organic acids the use of quaternary ammonium bases was suggested.

I have discovered that a variety of polar organic substances which are miscible with water in all proportions have the ability of increasing the solvent power of aqueous alkali toward organic acids to a high degree. Substances possessing these characteristics are called solubility promoters, and the expression solubility enhancing as herein used relates to the increase in solvent power, i. e. the difference in solvent power of the aqueous caustic alkali for the organic acids before and after the addition of the solutizer.

The term caustic alkali refers to all strongly alkaline bases, i. e. the alkali metal hydroxides, alkaline earth hydroxides, quaternary ammonium bases, alkali carbonates and bicarbonates, etc. although the hydroxides of the alkali metals are preferred. Especially useful are the sodium and potassium hydroxides, as being the strongest of the easily available bases. While sodium hydroxide is more generally used because of its lower cost, potassium hydroxide is usually considerably more effective.

Among the solubility promoters of particular interest may be mentioned polar compounds which are at least partially miscible with aqueous caustic alkali and which correspond to the formula $$X_1(CH_2)_nX_2$$

in which $X_1$ is a hydroxyl or amino radical, $X_2$ is selected from a group of radicals which is substantially resistant to hydrolysis in the presence of aqueous caustic alkali at elevated temperatures of the order of 100° C. consisting of

nitro, sulfone, sulfonate, carbonyl and carboxylate radicals, and $R_1$ and $R_2$ are hydrogen, methyl, $(CH_2)_nX_1$ or $(CH_2)_nX_2$ radicals, and $n$ is 2 to 7, except if $X_2$ is

in which case $n$ is preferably 2 or 3.

The group of compounds having the above formula includes certain primary, secondary, and tertiary alkanol amines and amino alkyl amines, nitro alcohols, hydroxy and amino sulfones and sulfonates, hydroxy and amino carboxylates, etc.

In determining all-around suitability of solubility promoters for the deacidifying of hydrocarbon type liquids from the point of view of economy, the ability of the solubility promoter to increase the solvent power of the aqueous caustic alkali is only one of the factors to be considered. Of about equal importance is the relative solubility of the solubility promoters in water and hydrocarbon liquids, which determines the partition of the solubility promoter between the aqueous and oil phases when they are brought into intimate contact. Loss of solubility promotor into the oil phase depends on this partition.

Different compounds of good solutizing properties have widely different relative solubilities in hydrophobe organic liquids. Thus of a series of compounds having about equal solubility enhancing properties for organic acids, some may be soluble in hydrophobe organic liquids to such an extent even in the presence of substantial amounts of water to make their use prohibitive, while others are practically insoluble in the presence of the same amount of water.

Increasing the water content of a caustic alkali solution containing solubility promoter reduces the losses of solubility promoter due to dissolution in the hydrophobe organic liquid. This effect is particularly pronounced in the region of a relatively high solubility promoter concentration.

In the following examples the solubilities of typical solubility promoters in a gasoline in the presence of different amounts of water are illustrated:

100 parts of a gasoline were shaken with 25 parts of a 2.5-normal aqueous caustic alkali solution prepared by dissolving the caustic alkali in aqueous solutizers of varying contents of water, and the amounts of solutizers dissolved in the gasoline were determined:

Table I

| Solubility promoter | Percentage of water | Volume percentage solubility promoter left in gasoline |
|---|---|---|
| Ethyl alcohol | 50 | 2.5 |
| Do | 25 | 2.9 |
| Ethylene glycol ethyl ether | 50 | 1.8 |
| Do | 25 | 2.0 |
| Ethanol amine | 50 | .008 |
| Do | 25 | .012 |
| Ethylene diamine* | 50 | .020 |
| Do* | 25 | .14 |
| Propanol amine | 50 | .06 |
| Do | 25 | .11 |

* Contains 1.25 N caustic.

The solutizing powers of the solubility promoters in the above table being of a similar magnitude it will be seen that the amino compounds having an additional polar radical are vastly superior to other solubility promoters such as lower monohydric alcohols and glycol ethers.

The rule governing suitability of solubility promoters is that they must not only be effective as solubility promoters in the lowest concentrations possible, i. e. in the presence of a substantial amount of water, but also be substantially insoluble in hydrophobe organic liquids in the presence of that amount of water. Only if the solubility promoters are capable of greatly increasing the solvent power for organic acids at concentrations at which they are substantially insoluble in hydrophobe organic liquids can they be said to be suitable.

This combination of properties rules out a large number of polar compounds such as simple monohydric alcohols of more than 2 carbon atoms, ethylene glycol, glycerine, simple ethers, etc. While some of the unsuitable compounds such as ethyl alcohol, propyl alcohol, ethylene glycol ethyl ethers etc. have good solubility enhancing properties but are too soluble in the hydrocarbon type liquids, other compounds such as ethylene glycol and glycerine possess negative solutizing powers, i. e. they actually lower the solubility enhancing of mercaptans and other weak organic acids in aqueous caustic alkali under the conditions of my treatment.

A third property to be considered is regenerability. Unless the solubility promoters, or preferably the aqueous caustic alkali containing the solubility promoters, can be regenerated in a simple manner, the application of solubility promoters has little practical value, if any.

I am aware that the use of solutions of alkali hydroxides in polar organic substances such as alkanol amine in the treatment of hydrocarbon oils is known. However, in the processes of this type heretofore suggested the solutions are used in a substantially anhydrous state. In contrast to this and for the aforementioned reasons, I employ solutions of certain solubility promoters containing a substantial amount of water. I have found that when using for solubility promoters compounds of the type falling within the range of the aforementioned formula the optimum water content of an alkaline solution containing them lies between about 5 and 70% and preferably between 15 and 50%. In general, solubility promoters having relatively long carbon chains require a larger amount of water for optimum economy and a correspondingly lower solubility promoter concentration than solubility promoter having shorter carbon chains, since, in general, both solvent enhancing effect and solubility in hydrocarbon liquids increase with increasing length of the carbon chain.

The solubility promoter concentration in the aqueous caustic alkali to be effective may vary from about 15 to 85% and usually is kept between about 25 and 75%, this being the most economical range for most solubility promoters. The solubility enhancing effect normally increases with increasing concentration of both the solubility promoter and the caustic alkali. Within limits, an increase in the caustic alkali concentration has a similar effect as an increase in the solubility promoter concentration. Thus, whereas for instance a 2- or 3-normal caustic alkali solution in a 25% aqueous solubility promoter such as ethanol amine is relatively ineffective, a substantially saturated aqueous caustic alkali having a normality of about 10 or 12 in the same aqueous solubility promoter is highly effective as may be seen in the table below:

Table II

| Caustic soda in 25% aqueous ethanol amine | Mercaptan | K |
|---|---|---|
| 2.5 N | n-Butyl | 29.3 |
| 2.5 N | n-Amyl | 4.4 |
| 2.5 N | n-Heptyl | .2 |
| 12.5 N | n-Butyl | 1,680 |
| 12.5 N | n-Amyl | 1,020 |
| 12.5 N | n-Heptyl | 552 |

In the above table K is the partition coefficient for the mercaptans between the aqueous caustic alkali containing solubility promoter and gasoline.

To minimize losses of solubility promoters it is thus often advantageous to use relatively strong caustic alkali solutions containing a lesser amount of solubility promoters.

Of the suitable compounds having the aforementioned formula, I prefer those which correspond to the formula

in which X is a hydroxyl or amino radical, $n$ is 2 or 3, $R_1$ and $R_2$ are hydrogen, methyl or the $(CH_2)_nX$ radical, and X and N are attached to vicinal carbon atoms. Examples of preferred compounds are: mono-, di- and tri-ethanol amines, 1-2- propanol amine, 1-2- or 2-3- di- and tri-propanol amines, mono-, di- and tri- amino ethyl amines, 1-2- amino propyl amines, etc.

The closeness of the polar group has marked influence upon the relative solubility enhancing power towards organic acids and solubility in hydrocarbon type liquids, this relation being less favorable the farther apart the polar radicals are from each other.

Depending upon the type of organic acids which are primarily to be extracted from hydrophobe organic solutions, I may choose different solubility promoters. For instance, I have found that solubility promoters having relatively long chains possess a preferential selective solubility enhancing power for the higher members of a class of organic acids, such as, for instance, the class of normal mercaptans, whereas solubility promoters having shorter carbon chains possess more even solubility enhancing powers for all members. "Selective solubility enhancing" as herein used refers to the relative improvement of the solvent powers of aqueous alkaline solutions toward various organic acids upon addition of solubility promoters. For example, if a solubility promoter increases the solubility in aqueous caustic alkali of a 7-carbon mercaptan to a greater extent than that of a 4-carbon mercaptan, the solubility promoter is selective for the heavier mercaptan in spite of the fact that usually the solubility of the lower mercaptan in the caustic alkali containing solubility promoter remains greater than that of the heavier mercaptan because of the great difference between the solubilities of the two mercaptans in aqueous caustic alkali free from solubility promoter. The effect of the selective solubility promoter is thus not only to raise the general level of solubilities, but also to minimize differences between solubilities of homologous members of a group of organic acids. The application of selective solubility promoters is of great importance, for instance, in the sweetening of sour West Texas gasolines which due to their content of relatively large quantities of higher mercaptans are very difficult to desulfurize and sweeten.

In cases where a hydrophobe organic liquid contains both higher and lower organic acids I may advantageously use mixtures of solubility promoters having different selectivities. For instance, I have found butylene glycols described in my copending application Serial No. 102,893 filed September 28, 1936 to be highly selective for higher mercaptans whereas ethylene diamine is not. Mixtures of the two have given excellent results in the sweetening of certain sour West Texas gasolines. If desired, known solubility promoters other than those herein described such as methyl or ethyl alcohols, quaternary ammonium bases, certain glycols of the type described in my copending application Serial No. 102,893, filed September 28, 1936 etc. may be combined with one or several members of my group.

Mixtures are desirable for an additional reason. Diamines which have tremendous solubility enhancing powers for organic acids are easily salted out by caustic alkali from their aqueous solutions. Thus I have found that a 2.5-normal caustic alkali solution is capable of dissolving a small amount only of ethylene diamine, too small to be really effective. If, however, I combine ethylene diamine with an alkanol amine or the like, I can incorporate into the caustic alkali solution a much larger quantity of the diamine without obtaining a phase separation. In this manner I can combine the advantages of high caustic alkali concentration, effective quantity of solubility promoters, and controlled selective solubility enhancing power for various organic acids.

My treating process is preferably carried out at or near ordinary room or atmospheric temperatures, although higher or lower temperatures may be employed. As a general rule the efficacy of the extraction of acid compounds decreases with increasing temperature. On the other hand, the improvement due to lowering the treating temperature to subatmospheric temperature is usually insufficient to warrant artificial refrigeration.

The caustic alkali solution containing the requisite amount of solubility promoter may simply be mixed with the hydrocarbon distillate; the resulting mixture is then allowed to separate, the two liquids are separately withdrawn and the spent caustic alkali may be subjected to a treatment to recover at least the solubility promotor. For more efficient extraction, however, we prefer to flow the caustic alkali solution and hydrophobe organic liquids in countercurrent to each other through a series of continuous treaters.

In spite of a substantial amount of water contained in the caustic alkali containing solubility promoter solution, a small amount of solubility promoter is dissolved in and carried away by the hydrocarbon type liquid. To recover this small amount, or at least a major portion thereof, we usually wash the treated liquid with a circulating stream of water. The same water may be used to wash successive quantities of treated liquid, until the concentration of the solubility promoter in the water is built up to a point at which the solubility promoter content of the treated liquid is insufficiently reduced. Since the amount of solubility promoter in the treated liquid is very small and since, moreover, the solubility promoters are preferentially soluble in water, a small amount of water will successively wash large amounts of treated liquid. Usually the ratio of wash water necessary to wash a treated hydrocarbon type liquid is well below 1:1000. The solubility promoter content in the wash water may be allowed to accumulate to a concentration of about 10 to 50%, after which the enriched wash water may be added to the caustic alkali.

Methods for the recovery of the solubility promoter in the spent caustic alkali solution or of the caustic alkali itself vary with the type of acids absorbed. If the spent caustic contains essentially alkali caustic sulfides and/or salts of carboxylic acids, it cannot itself be regenerated in any simple manner. Regeneration is then limited to a recovery of the solubility promoter. This can, for instance, be achieved by steam distillation, preferably under reduced pressure. Also solvent extraction with a solvent for the solubility promoter, which solvent is only partially miscible with the aqueous caustic alkali, may be applicable.

If, however, the acids contained in the spent caustic alkali consist substantially only of mercaptans, the entire solution can be regenerated by steaming, if desired under superatmospheric pressures and preferably under reflux of water or part of the distillate. In the steaming operation mercaptans are carried off by the steam.

The ease of steam regeneration, i. e. the amount of steam per pound of caustic alkali required to reach certain desired low mercaptide content in the caustic alkali solution, depends upon the concentrations of both the solubility promoter and the caustic alkali, lower concentrations of both facilitating the regeneration. Of two caustic alkali containing solubility promoter solutions having about equal solvent power for mercaptans, one having a higher caustic alkali and lower solubility promoter concentration than the other, the first one usually requires less steam for expelling the mercaptans. For example, two solutions containing 5-normal caustic alkali in 50% ethanol amine, and 2.5-normal caustic alkali in 75% ethanol amine, respectively, each containing .5 mols per liter normal butyl mercaptide were steamed under identical conditions with 1.0 lbs. steam per pound of solution. The mercaptide content of the 5-normal caustic alkali was reduced to .15 mols per liter whereas that of the 2.5-normal caustic alkali solution was only reduced to .22 mols per liter. Thus, from this point of view, it appears desirable to use the solubility promoters in the lowest effective concentration.

That the ease and completeness of the regeneration is of great importance may readily be seen by considering that, when extracting mercaptans from an oil phase with a regenerated caustic alkali solution containing mercaptides, the mercaptan content in the oil phase cannot be reduced below the equilibrium concentration of the mercaptans in the oil phase with the mercaptides in the regenerated caustic alkali. The higher the mercaptide content is, the higher is obviously the equilibrium concentration. If the mercaptide content in the regenerated caustic alkali exceeds a certain maximum, sweetening of the oil phase becomes impossible.

If the solubility promoter is relatively low boiling, ethylene diamine, one of the lowest boiling of the solutizers herein described, boiling at 116.5° C., then the steam used for expelling the mercaptans is preferably fractionated in an efficient bubble tower to separate vaporized solubility promoters therefrom. If sufficient reflux is used, this fractionation can be achieved fairly completely. The steam containing mercaptans and some solubility promoter may then be condensed; mercaptans are allowed to segregate and are separated. Preferably, the water of condensation which usually contains some solubility promoter is returned to the steam boilers for the regeneration of steam to be used in the steaming. In this manner, last traces of solubility promoters are recovered.

Since the presence of acids stronger than mercaptans in the spent caustic alkali precludes steam regeneration, I usually pretreat solutions of mercaptans and stronger organic acids in hydrophobe organic liquids in a manner to separate the stronger acids only, and then treat the pretreated solution according to my invention. In this manner a regenerable spent caustic alkali containing the solutizer and mercaptides only is obtained. Suitable pretreatment may consist of a simple water wash, aqueous caustic alkali treatment, fractional distillation, etc.

The attached drawing represents a flow diagram of one form of my process. Hydrocarbon type liquid containing mercaptans, propelled by pump 1 in line 2, passes through a continuous conventional countercurrent treating system 3, preferably comprising several stages. An aqueous caustic alkali solution containing solubility promoter of the type hereinbefore described, which is pumped from tank 4 by pump 5 enters the treating system 3 through line 6 to flow in countercurrent to the hydrocarbon type liquid. Spent caustic alkali leaves treater 3 through line 7.

Treated hydrocarbon type liquid substantially free from mercaptans but containing a small amount of solubility promoter is transferred through transfer line 8 to washer 9 to be washed continuously with water from tank 10. The water is circulated by pump 11 in line 12 through the washer 9 in countercurrent to the treated hydrocarbon type liquid and then through line 13 back into tank 10. The water is preferably circulated at such a rate that the ratio of water to oil in the washer 9 is of the order of about 1:2 to 1:10.

As the water circulates, it gradually picks up solubility promoter from the passing treated liquid, and when the solubility promoter in the water has reached a concentration of about 10 to 50% it is diverted through line 14 to join the spent caustic alkali in line 7. Fresh water from line 15 is introduced into the water tank 10, whereupon the circulation continues. If desired, instead of discarding the circulating water in batch, a small portion may be withdrawn and be added to the spent caustic alkali continuously.

Treated hydrocarbon liquid substantially free from solubility promoter is withdrawn from washer 9 through top line 16 to storage or further treatment.

The spent caustic alkali in line 7 together with spent water from the water wash goes to storage tank 17, whence it is pumped by pump 18 in line 19 through heater 20 to the steaming and fractionating column 21 containing bubble trays 22. The caustic alkali enters column 21 at an intermediate point. Steam generated in steam boiler 23 is blown through line 24 and column 21, in countercurrent to the caustic alkali flowing over the bubble trays in the lower portion of the column. During this steaming, mercaptans are carried off by the steam together with some solubility promoter. In the upper portion of column 21 a fractionation is effected, the major portion of the solubility promoter being condensed and eventually withdrawn, together with regenerated caustic alkali, through bottom line 25 to reboiler 26.

Reboiler 26 is heated by the closed steam coil 27 operated with steam from boiler 23. Excess water in the caustic alkali is driven off through vapor line 28, and regenerated caustic alkali of the proper concentration containing substantially all of its original solubility promoter and having substantially the composition of the original caustic alkali is withdrawn through line 29, cooler 30, into storage tank 4. Make-up caustic alkali and solubility promoter to compensate for the infinitely small losses may be introduced into tank 10 through line 31.

The upper part of column 21 comprises an efficient fractionating tower such as a bubble tower. The vapors leaving the column through vapor line 32 consist largely of steam and mercaptans, which form azeotropic mixtures, and a relatively small amount of solubility promoter. The vapors are condensed in condenser 33 and the resulting condensate is separated in separator 34. Water insoluble mercaptans rise to the top and are withdrawn through line 35. A portion of the water which usually contains some solubility promoter is returned by pump 36 in line 37 as reflux to the top of column 21, while the remainder may be discarded through line 28, or preferably is pumped by pump 39 through line 40 to the steam boiler 23. Solubility promoter, together with the steam generated therein, returns through line 24 to the caustic alkali in column 21. Make-up water for the steam boiler 23 is introduced through line 41.

The advantages of my preferred solubility promoters over other polar compounds capable of acting as solubility promoters when applied to the described processes are demonstrated by the illustrative data below. West Texas straight run gasoline having a mercaptan sulfur content of .116% was extracted in a 1-stage treater with 25% by volume of 2.5-normal aqueous sodium hydroxide containing solubility promoters. The treated gasoline was then washed with 25% by volume of water for the recovery of the dissolved solubility promoters. The following results were observed:

Table III

| Solubility promoter | Percentage mercaptan sulfur left in treated gasoline | Gallons solubility promoters lost per barrel gasoline |
| --- | --- | --- |
| 75% ethanol amine | 0.0230 | $1\times10^{-3}$ |
| 60% ethylene diamine* | 0.0379 | $2.3\times10^{-4}$ |
| 50% ethyl alcohol | 0.0360 | $5\times10^{-3}$ |

* Contains only 1.25 N NaOH.

I claim as my invention:

1. In the process of separating organic acid reacting substances contained in a substantially water-insoluble organic liquid which is chemically inert to strong bases under the conditions of the process, the steps comprising treating said liquid with an aqueous solution of a strong base containing about 15 to 85% of a compound selected from the group consisting of amino-alkylamines and alkanolamines whose alkylene groups contain less than 4 carbon atoms, under conditions to absorb a major portion of said acid reacting substances in said aqueous solution and to form two liquid layers, one comprising the aqueous solution containing absorbed acid reacting substances and the other consisting essentially of the treated organic liquids, and separating the layers.

2. The process of claim 1 in which said compound is ethanol amine.

3. The process of claim 1 in which said compound is propanol amine.

4. The process of claim 1 in which said compound is ethylene diamine.

5. The process of claim 1 in which the aqueous solution contains between 5 and 70% water.

6. In the process of separating organic acid reacting substances contained in a substantially water-insoluble organic liquid which is chemically inert to strong bases under the conditions of the process, the steps comprising treating said liquid with an aqueous solution of a strong base containing about 15 to 85% of a mixture of an amino-alkylamine and an alkanolamine whose alkylene groups contain less than 4 carbon atoms, under conditions to absorb a major portion of said acid reacting substances in said aqueous solution and to form two liquid layers, one comprising the aqueous solution containing absorbed acid reacting substances and the other consisting essentially of the treated organic liquid, and separating the layers.

7. The process of claim 1 in which the base is an alkali metal hydroxide.

8. The process of claim 1 in which the aqueous solution is a solution of an alkali metal hydroxide having a normality of at least 2.5.

9. In the process of separating mercaptans contained in a hydrocarbon liquid, the steps of treating said liquid with an aqueous solution of an alkali metal hydroxide containing about 15 to 85% of a compound selected from the group consisting of amino-alkylamines and alkanolamines whose alkylene groups contain less than 4 carbon atoms under conditions to absorb a major portion of said mercaptans in said aqueous solution and to form two liquid layers, one comprising the aqueous solution containing absorbed mercaptans and the other consisting essentially of treated hydrocarbon liquid, and separating the layers.

DAVID LOUIS YABROFF.